US007159343B2

(12) United States Patent
Hanafusa et al.

(10) Patent No.: US 7,159,343 B2
(45) Date of Patent: Jan. 9, 2007

(54) WORKING MACHINE

(75) Inventors: Jitsumi Hanafusa, Wako (JP); Tsuyoshi Yoshigasaki, Wako (JP)

(73) Assignee: Honda Motor Co., Ltd. (JP)

( * ) Notice: Subject to any disclaimer, the term of this patent is extended or adjusted under 35 U.S.C. 154(b) by 189 days.

(21) Appl. No.: 10/761,956

(22) Filed: Jan. 21, 2004

(65) Prior Publication Data
US 2004/0148819 A1    Aug. 5, 2004

(30) Foreign Application Priority Data

| Jan. 21, 2003 | (JP) | ............................. 2003-012673 |
| Jan. 21, 2003 | (JP) | ............................. 2003-012698 |
| Jan. 21, 2003 | (JP) | ............................. 2003-012717 |
| Jan. 21, 2003 | (JP) | ............................. 2003-012769 |

(51) Int. Cl.
  *E01H 5/04* (2006.01)
(52) U.S. Cl. .......................................... 37/244; 37/257
(58) Field of Classification Search ................. 37/257, 37/244, 219, 223, 231, 241, 247, 403, 189, 37/222; 172/74, 79, 108
See application file for complete search history.

(56) References Cited

U.S. PATENT DOCUMENTS

| 2,998,082 | A | * | 8/1961 | Arnot ........................... 172/42 |
| 3,603,162 | A | * | 9/1971 | Gohler .......................... 74/16 |
| 4,123,857 | A |   | 11/1978 | Enters et al. .................. 37/43 |
| 4,354,564 | A | * | 10/1982 | Watanabe et al. ........... 180/19.1 |
| 4,640,366 | A | * | 2/1987 | Saito ............................ 172/42 |
| 4,783,915 | A | * | 11/1988 | Sasaki et al. ................. 37/251 |
| 6,643,959 | B1 | * | 11/2003 | Jolliff et al. ................. 37/244 |
| 6,823,947 | B1 | * | 11/2004 | Nagaoka et al. ............. 172/42 |

FOREIGN PATENT DOCUMENTS

| EP | 1138831 | 10/2001 |
| JP | 51030378 | 8/1976 |
| JP | 53005210 | 2/1978 |
| JP | 01271317 | 10/2001 |

* cited by examiner

Primary Examiner—Meredith C. Petravick
(74) Attorney, Agent, or Firm—Adams & Wilks

(57) ABSTRACT

A working machine has a transmission case having a transmission mechanism accommodated therein. The transmission mechanism has an input shaft having a first longitudinal axis and an output shaft having a second longitudinal axis extending in a direction generally perpendicular to the first longitudinal axis. A working unit is mounted to a front portion or a side portion of the transmission case and is connected to the output shaft of the transmission mechanism. A working is drive source is connected to the input shaft of the transmission mechanism for driving the working unit via the transmission mechanism for driving the working unit via the transmission mechanism. The working drive source is mounted to an upper surface portion of the transmission case. A traveling unit has at least one driving axle mounted to a side portion of the transmission case. An electric motor is mounted to a side portion of the transmission case for driving the traveling unit.

24 Claims, 14 Drawing Sheets

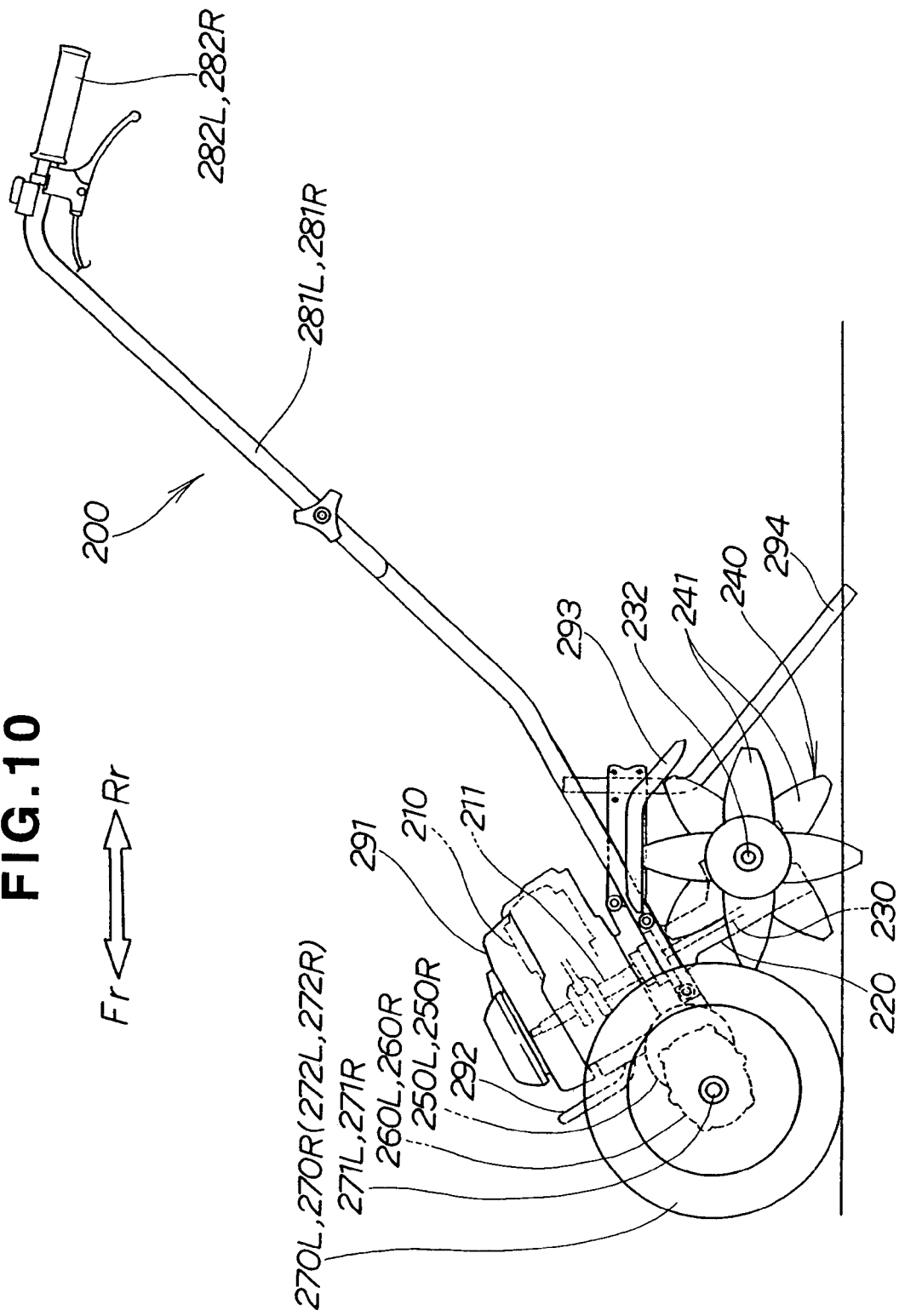

WORKING MACHINE

BACKGROUND OF THE INVENTION

1. Field of the Invention

The present invention relates to improvements in self-propelled working machines, such as snow removing machines and cultivating machines.

2. Background Information

In recent years, there have been developed self-propelled working machines which are controllable by a human operator manipulating an operating handle unit while walking, with a view to reducing human labor necessary for intended work, such as snow removing work or agricultural work. Such working machines are known, for example, from Japanese Patent Publication No. SHO-51-30378 (hereinafter "Patent Document 1"), Japanese Patent Publication No. SHO-53-5210 (hereinafter "Patent Document 2") and Japanese Patent Application Laid-open Publication No. 2001-271317 (hereinafter "Patent Document 3").

FIG. 12 is a side view showing one side of an auger-type snow removing machine disclosed in Patent Document 1 (Japanese Patent Publication No. SHO-51-30378). The disclosed snow removing machine 300 includes left and right crawler belts (only the left crawler belt is shown) 301 each supported on a corresponding traveling-component supporting frame 302, a main frame 303 mounted above the traveling-component supporting frames 302 for vertical pivotal movement about a pivot axis 309, an engine 304 mounted on an upper surface portion of the main frame 303, and a snow removing working section 305 secured to a front portion of the main frame 303. The snow removing machine 300 also includes a jack 306 which can cause not only the arm frame 303 but also the engine 304 and snow removing working section 305 to pivot vertically. The engine 304 drives the snow removing working section 305, including an auger 307 and blower 308, to perform snow removing work.

FIG. 13 is a side view of an auger-type snow removing machine disclosed in Patent Document 3 (Japanese Patent Application Laid-Open Publication No. 2001-271317). In the disclosed snow removing machine 400, power from a horizontal engine 402 having a crankshaft 401 extending horizontally forward is transmitted to a snow removing working section 405 via a snow-removing power transmission mechanism 403 and transmission shaft 404, and power from left and right electric motors 406 is transmitted to left and right crawler belts 409 via driving axles 407 and driving wheels 408. More specifically, in the snow removing machine 400, the motors 406 and driving wheels 408 are mounted on rear portions of corresponding traveling-component supporting frames 411, while idle wheels 412 are mounted on front portions of the corresponding traveling-component supporting frames 411. The crawler belts 409 are passed around the driving wheels 408 and idle wheels 412, and a vehicle body frame or main frame 413 is provided above the traveling-component supporting frames 411 for vertical pivotal movement about a pivot axis 417. The horizontal engine 402 and snow-removing power transmission mechanism 403 are mounted on an upper surface portion of the main frame 413, and the snow removing working section 405 is attached to a front portion of the main frame 413. The snow removing machine 400 also includes a frame elevator mechanism 414 which can cause the engine 402, snow-removing power transmission mechanism 403 and snow removing working section 405 to pivot vertically together with the main frame 413. The engine 402 drives the snow removing working section 405, including an auger 415 and blower 416, to perform snow removing work.

As set for the above, the engine 304 and working section 305 in the snow removing machine 300 of FIG. 12 are attached to the main frame 303, and the engine 402, snow-removing power transmission mechanism 403 and snow removing mechanism 405 in the snow removing machine 400 of FIG. 13 are also attached to the main frame 413. Thus, the main frame in each of the above-discussed conventional snow removing machines 300 and 400 must have a large size, relatively complicated shape and high rigidity. Thus, the conventional snow removing machines 300 and 400 each tend to have a great overall size and weight as well as a large number of component parts. Similar inconveniences would be presented by the conventional machine disclosed in Patent Document 2.

Further, FIG. 14 is a side view of an auger-type snow removing machine disclosed in Patent Document 4 (Japanese Patent Application Laid-Open Publication No. SHO-63-513). In the disclosed snow removing machine 500, power from a horizontal engine 502 having a crankshaft 501 extending horizontally forward is transmitted to a snow removing working section 506 via a snow-removing power transmission mechanism 503 accommodated in a transmission case 503 and a transmission shaft 504, and the power from the horizontal engine 502 is also transmitted to left and right crawler belts (only the left crawler belt is shown) 509 via a driving axle 507 and driving wheels 508. More specifically, in the snow removing machine 500, the horizontal engine 502 is mounted on traveling-component supporting frames 512 supporting thereon idle wheels 511 of the left and right crawler belts 509, the transmission case 503 is connected to a front end portion of the engine 502, and the snow removing working section 506 is attached to a front end portion of the transmission case 503. Further, the driving axle 507 is secured to a lower portion of the transmission case 503, and the left and right driving wheels 508 are mounted on the driving axle 507. The snow removing working section 506, which includes an auger 521 and blower 522, is driven by the engine 502 to perform snow removing work. In this machine 500, the snow removing working section 506 is not constructed to pivot vertically. Generally, an enhanced snow removing efficiency and finish quality may be provided by making arrangements for allowing the lower end portion of the snow removing working section 506 to readily bite into the snow surface. For that purpose, it is preferable to set the center of gravity of the snow removing machine 500 at a position closer to the front end of the machine 500. However, if the center of gravity of the snow removing machine 500 is too close to the front end, traveling performance of the crawler belts 509 on the snow surface would be adversely influenced. Thus, it is more preferable to set the center of gravity of the snow removing machine 500 at a position close to the front end of the machine 500 and near the driving axle 507.

However, because the snow removing machine 500 includes the snow removing working section 506 in a front portion thereof, the horizontal engine 502 having its crankshaft 501 extending horizontally forward has to be provided in a rear portion of the machine 500. Thus, the heavy engine 502 is located immediately above the idle wheels 511 that are located remotely from and rearward of the driving wheels 508 with a great distance formed from the engine 502 to the snow removing working section 506, which would thereby increase the overall size of the snow removing machine 500. Due to the great length, the snow removing machine 500 would present a poor turning capability. Further, because the heavy engine 502 is positioned near the rear end of the machine 500, some consideration has to be made to set the center of gravity of the snow removing machine 500 at an optimal position.

One possible approach for avoiding the inconveniences is to replace the horizontal engine 502 with a vertical engine having a vertically-extending crankshaft. But, merely employing such a vertical engine would considerably complicate the construction of the snow removing machine 500. Similar inconveniences would occur in the conventional machine 400 disclosed in Patent Document 3.

SUMMARY OF THE INVENTION

In view of the foregoing prior art problems, it is an object of the present invention to provide an improved working machine, such as an improved snow removing machine, which has a reduced size and weight and a reduced number of component parts.

It is another object of the present invention to provide an improved snow removing which can achieve an enhanced snow removing efficiency and finish quality while securing satisfactory traveling performance of crawler belts on a snow surface.

According to one aspect of the present invention, there is provided a working machine which comprises: a working unit including an auger or cultivating claws; a traveling unit including crawler belts or traveling wheels; a transmission case having a transmission mechanism accommodated therein; a working drive source for driving the working unit via the transmission mechanism; and an electric motor for driving the traveling unit. In this working machine, the transmission mechanism includes an input shaft extending upward to connect to the working drive source and an output shaft extending substantially horizontally to connect to the working unit. Further, the working drive source is mounted on an upper surface portion of the transmission case, the electric motor and a driving axle of the traveling unit are attached to side portions of the transmission case, and the working unit is attached to a front portion or side portion of the transmission case.

With the working drive source mounted on the upper surface portion of the transmission case and the electric motor, driving axle of the traveling unit and working unit attached to the side and front portions of the transmission case, the transmission case, accommodating the transmission mechanism for transmitting power from the working drive source to the working unit, can function also as a main frame of the working machine. Therefore, the present invention can dispense with a separate main frame for mounting the working drive source, working unit, electric motor and driving axles. As a result, it is possible to significantly reduce the size and weight of the working machine, as well as the number of necessary component parts of the machine. With the reduced size, the operability of the working machine can be enhanced.

In one embodiment of the present invention, the working machine is constructed as a snow removing machine, where the working drive source comprises an engine mounted on the upper surface portion of the transmission case, a snow removing working section is attached, as the working unit, to the front portion of the transmission case, and the traveling unit comprises left and right traveling sections each including a crawler belt. In this machine, the transmission case is disposed between the left and right traveling sections, and driving axles of the left and right traveling sections are attached to side portions of the transmission case. With such arrangements, the transmission case can function also as a main frame of the snow removing machine. Therefore, the embodiment can dispense with a separate main frame for mounting the engine, snow removing working section, electric motor and driving axles. As a result, it is possible to significantly reduce the size and weight of the snow removing machine, as well as the number of necessary component parts of the machine. With the reduced size, the operability of the snow removing machine can be enhanced. Further, with the driving axles mounted to the transmission case functioning also as the main frame, the weights of the transmission case, engine, snow removing working section, electric motor can suitably act on the traveling sections. As a consequence, the traveling sections can be given a sufficient driving force, and thus the traveling sections can present enhanced traveling performance on a snow surface.

In one embodiment, the transmission case is arranged to function also as part of a case of the electric motor (i.e., motor case), which can therefore reduce the size and weight of the motor case and minimize an projection amount of the electric motor projecting leftward or rightward from the side of the transmission case. For example, even where the driving axles are connected via a speed reduction mechanism to the motor and there is a limitation on the width of the snow removing machine, the speed reduction mechanism can be readily installed adjacent to a side portion of the transmission case. Further, a harness for the electric motor can be inserted in the transmission case functioning also as part of the motor case. Because the harness can be prevented from being exposed outside the machine in this way, it can have increased durability and reliability.

In one preferred embodiment, the working machine is constructed as a snow removing machine, where the working drive source is a vertical engine mounted on the upper surface portion of the transmission case and having a downwardly-extending crankshaft, a snow removing working section is provided as the working unit, the traveling unit comprises left and right crawler belts drivable by the electric motor via left and right driving wheels, and the snow removing working section is vertically pivotable about the central axis of axles of the left and right driving wheels together with the vertical engine and transmission mechanism. In this snow removing machine, the transmission mechanism is disposed immediately below the vertical engine, the snow removing working section is disposed in front of the transmission mechanism, the left and right crawler belts are disposed adjacent to and along left and right sides of the transmission mechanism, the left and right driving wheels and the electric motor are disposed adjacent to front end portions of the crawler belts, and the crankshaft is disposed near and rearward of the central axis of the axles. Thus, the heavy engine can be mounted near and rearward of the central axis of the axles. With such arrangements, the overall center of gravity of the snow removing machine is set between the central axis of the crankshaft and the central axis of the axles, which can establish optimal weight balance in the front-and-rear direction of the snow removing machine. Thus, the lower end of the snow removing working section is allowed to readily bite into a snow surface so as to achieve an enhanced snow removing capability and finish quality. Besides, it is possible to secure a superior travel performance of the crawler belts on the snow surface. Further, because the heavy engine, transmission mechanism and electric motor are disposed near the central axis of the axles of the driving wheels, the snow removing working section can be caused to vertically pivot about the central axis of the axles with a relatively small operating force. This arrangement can facilitate operation for vertically pivoting the snow removing working section to set a desired biting (or cutting) angle of the snow removing working section relative to the snow surface.

In one embodiment of the snow removing machine, the vertical engine has a cylinder section oriented toward a rear end of the machine, and the body of the vertical engine has a front surface located adjacent to a rear surface of the snow removing working section. With the cylinder section of the vertical engine oriented toward the rear end of the machine and the front surface of the engine located adjacent to the rear surface of the snow removing working section, the vertical engine can be mounted near the snow removing working section. Further, because the transmission mechanism includes the upward input shaft and forward output shaft, the vertical engine is mounted on the upper surface portion of the transmission case, the engine crankshaft extending downward is coupled to the upward input shaft and the snow removing working section is attached to the front of the transmission case and coupled via the transmission shaft to the output shaft, the vertical engine can be positioned near the snow removing working section, so that the front-to-rear dimension of the transmission case can be reduced. As a result, the overall size of the snow removing machine can be significantly reduced, and the reduced length of the machine can enhance a turning capability of the machine. Furthermore, the reduced front-to-rear dimension of the transmission case can reduce the length of the output shaft. As a consequence, it is possible to reduce a bending moment produced in the output shaft, so that the output shaft may have a smaller diameter and bearings supporting the output shaft may have a smaller size. In addition, the heavyweight vertical engine, transmission mechanism and transmission case can be positioned closer to the snow removing working section. By thus setting the center of gravity of the snow removing machine, the lower end of the snow removing working section is allowed to readily bite or cut into the snow surface so as to achieve an enhanced snow removing capability and finish quality.

BRIEF DESCRIPTION OF THE DRAWINGS

Certain preferred embodiments of the present invention will hereinafter be described in detail, by way of example only, with reference to the accompanying drawings, in which:

FIG. 10 is a left side view of a cultivating machine constructed in accordance with another embodiment of the present invention

DETAILED DESCRIPTION OF THE PREFERRED EMBODIMENTS

Figure 1:
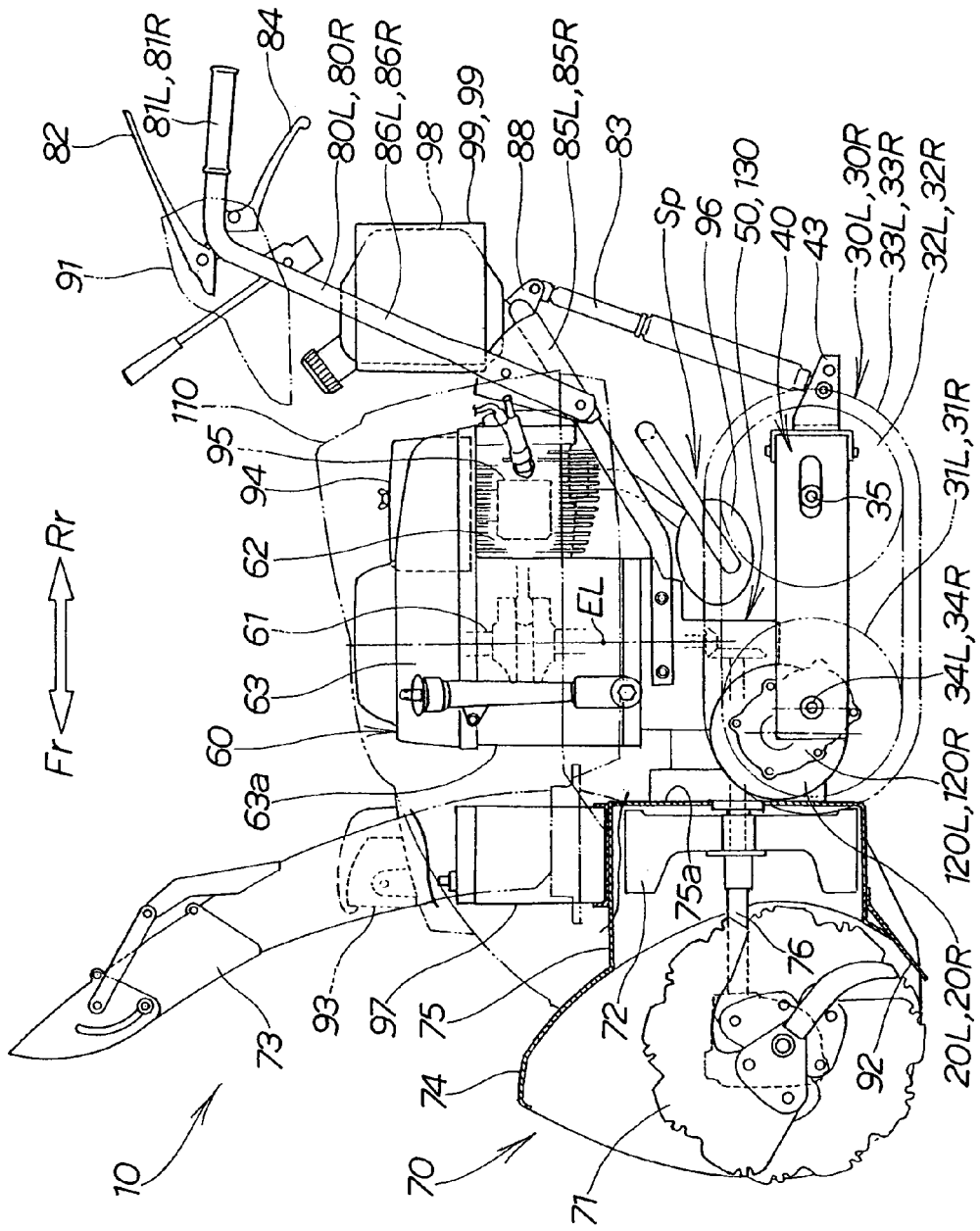
FIG. 1 is a first left side view of a working machine constructed as a snow removing machine in accordance with an embodiment of the present invention.

It should be noted that the terms "front", "rear", "left", "right", "upper", "lower", etc. represent directions as viewed by a human operator of a working machine of the present invention to be detailed hereinbelow, and that reference characters "Fr" and "Rr" represent forward and rearward directions. Further, letters "L" and "R" attached to some reference numerals represent left and right sides of the working machine, and "CL" represents a widthwise centerline of the machine.

FIG. 1 is a left side view of a working machine in accordance with an embodiment of the present invention, which is constructed as a self-propelled walking-type electric snow removing machine 10. The electric snow removing machine 10 includes a traveling-component supporting frame 40 having left and right traveling sections 30L and 30R supported thereon (only the left traveling section 30L is shown in FIG. 1). Transmission case 50, functioning also as a machine body, is mounted on the traveling-component supporting frame 40 for vertical pivotal movement. Left and right electric motors 21L and 21R are attached to left and right sides of the transmission case 50, an engine 60 is mounted on an upper surface portion of the transmission case 50, and a snow removing working section 70 is secured to a front portion of the transmission case 50. Further, left and right operating handles 80L and 80R (of an operating handle unit) extend rearwardly and upwardly from a rear upper portion of the transmission case 50, and an operation panel 91 is provided between the left and right operating handles 80L and 80R, so that the panel 91 is operable by a human operator manipulating the operating handles behind the panel 91.

The left traveling section 30L is in the form of a crawler, which includes a left crawler belt 33L passed around a front driving wheel 31L and a rear idle wheel 32L and where the driving wheel 31L is rotated in the forward direction by the left motor 20L. The right traveling section 30R is also in the form of a crawler, which includes a right crawler belt 33R passed around a front driving wheel 31R and a rear idle wheel 32R and where the driving wheel 31R is rotated in the forward direction by the right motor 20R.

Namely, the left and right motors 20L and 20R are traveling drive sources for driving the left and right traveling sections 30L and 30R via respective traveling power transmission mechanisms 120L and 120R.

Engine 60, which is a working drive source in the form of a vertical engine having a downwardly-extending crankshaft 61, drives the snow removing working section 70 via a working power transmission mechanism 130 and transmission shaft 76. The vertical engine 60 includes a rearwardly-extending cylinder section 62 in which a piston (not shown) reciprocates back and forth, and an engine body 63 accommodating the crank shaft 61 and having a front surface 63a adjacent to a rear surface 75a of the snow removing working section 70 (i.e., rear surface 75a of a blower housing 75).

The snow removing working section 70 includes an auger 71 provided in a front portion of the section 70, a blower 72 provided in a rear portion of the section 70, a chute 73 provided in an upper portion of the section 70, an auger housing 74 covering the auger 71, and a blower housing 75 covering the blower 72. The auger housing 74 is integrally formed with the blower housing 75.

The auger 71 functions to gather snow accumulated on the ground toward the middle of the machine 10, and the blower 72 receives and projects the thus-gathered snow to desired positions around the machine 10 via the chute 73.

The machine 10 also includes a pivoting drive mechanism 83, which is an expanding/contracting mechanism for driving the transmission case 50 to pivot in the vertical direction so as to adjust a height of the snow removing working section 70 above the ground surface and then hold the snow removing working section 70 at the adjusted height. The pivoting drive mechanism 83 preferably comprises an actuator having a piston rod movable into and out of a cylinder, such as an electric actuator, hydraulic actuator or pneumatic actuator.

In FIG. 1, reference numeral 92 represents a scraper, 93 a lamp, 94 an air cleaner, 95 a carburetor, and 96 an engine exhaust muffler.

Figure 2:
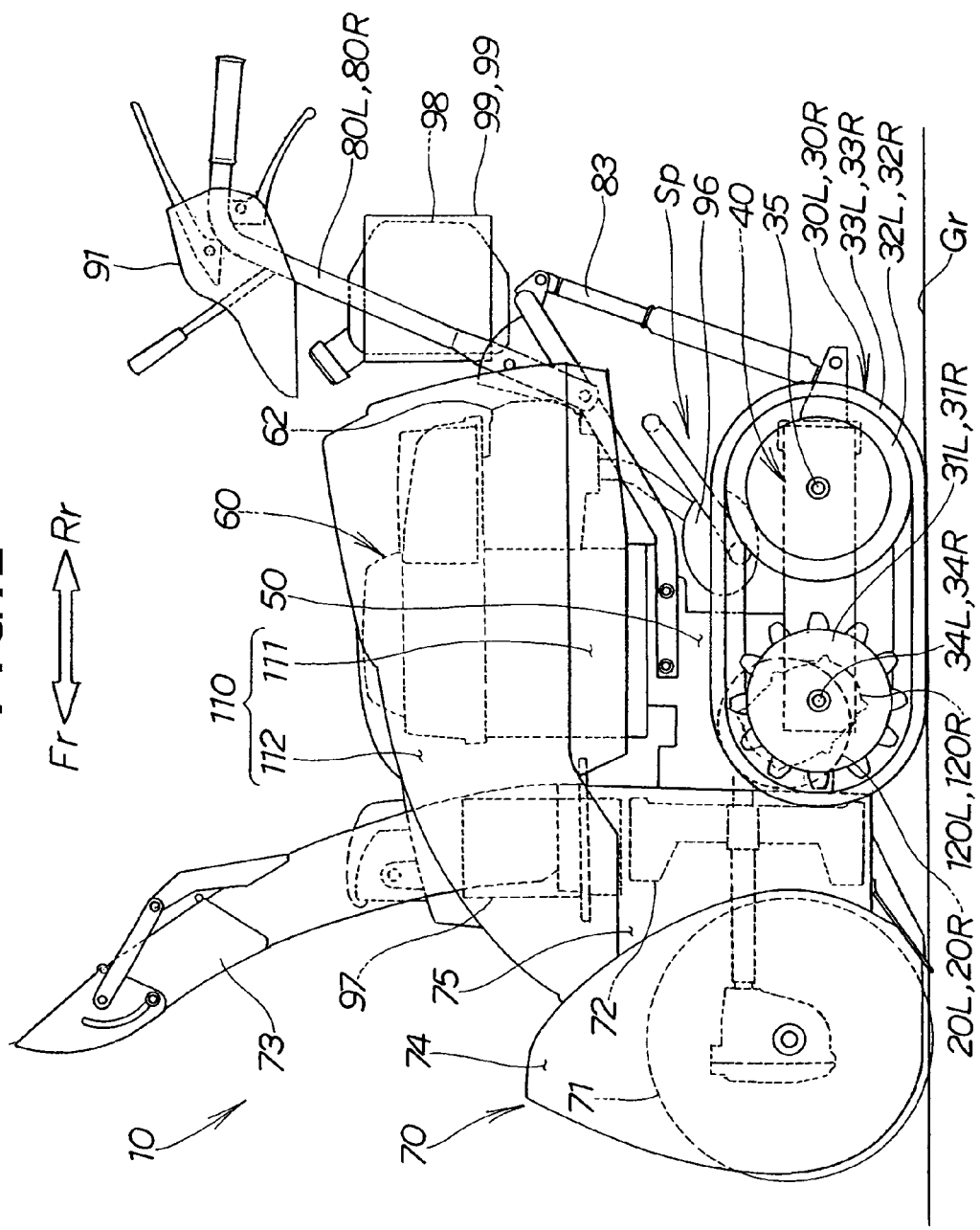
FIG. 2 is a second left side view of the snow removing machine, which particularly shows an engine and other components around the engine that are covered with a main machine cover.

FIG. 2 is a left side view of the snow removing machine 10, which particularly shows the engine 60 and other components around the engine 60 that are covered with a main machine cover 110. The cover 110 is a two-part cover comprising a lower cover portion 111 covering a lower half of the engine 60 and an upper cover portion 112 covering an upper portion of the engine 60.

As further seen in FIG. 2, the engine 60 is positioned immediately above the transmission case 50, and a space SP is formed under the rearwardly-extending cylinder section 62. The engine exhaust muffler 96 is disposed in the space SP so that the entire engine exhaust muffler 96 can be generally surrounded with the transmission case 50, traveling-component supporting frame 40 and pivoting drive mechanism 83, left and right crawler belts 33L and 33R, upper engine 60 and lower ground surface Gr. Such an arrangement can prevent the human operator directly touching the relatively hot entire engine exhaust muffler 96, and thus it suffices to partition between the operator and muffler 96 with a small-size heat shielding plate.

Figure 3:
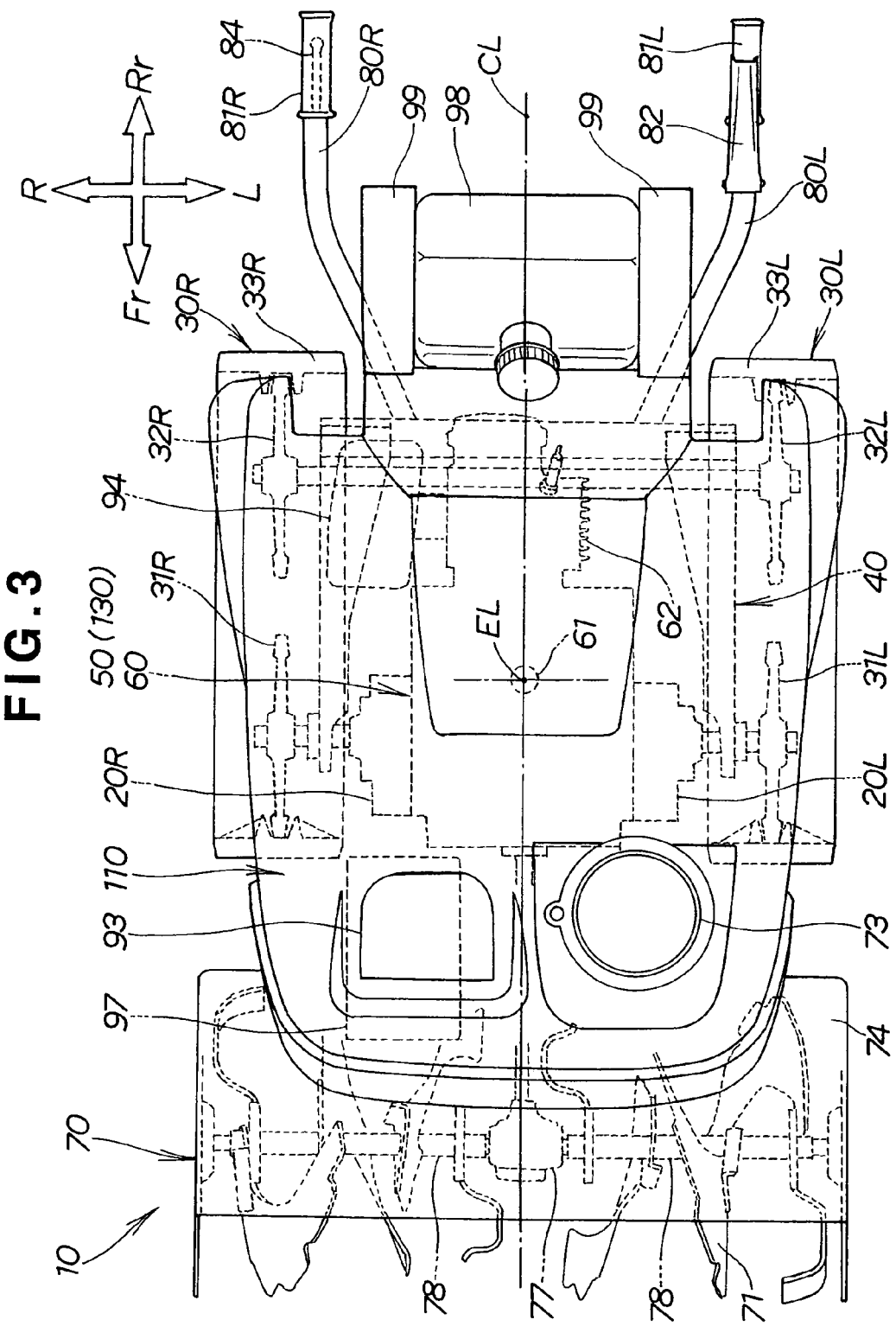
FIG. 3 is a top plan view of the snow removing machine of the present invention.

FIG. 3 is a top plan view of the snow removing machine 10 of the present invention, in which illustration of the operation panel 91 of FIG. 1 is omitted. As shown, the engine 60 is positioned in a central portion of the snow removing machine 10, the crankshaft (engine output shaft) 61 has its center EL on the widthwise centerline CL of the machine 10, and the transmission case 50 and working power transmission mechanism 130 accommodated therein are positioned immediately beneath the engine 60. Further, the snow removing working section 70 is positioned in front of the transmission case 50 and working power transmission mechanism 130, the left and right crawler belts 33L and 33R are positioned adjacent to and along the left and right sides of the transmission case 50 and working power transmission mechanism 130, and the left and right driving wheels 31L and 31R and the left and right motors 20L and 20R are positioned adjacent to front ends of the respective crawler belts 33L and 33R.

As further seen in the top plan view of FIG. 3, the chute 73 is positioned in a left front portion of the machine 10, the lamp 93 and battery 97 are positioned in a right front portion of the machine 10, the air cleaner 94 is positioned in a right rear portion of the machine 10, and a fuel tank 98 and left and right motor control sections 99 are provided beneath the operation panel 91 (FIG. 1) between the left and right operating handles 80L and 80R.

The left operating handle 80L has a grip 81L, and a travel preparation lever 82 provided near the grip 81L for placing the left and right motors 20L and 20R in a state ready for activation. The left operating handle 80R has a grip 81R, and an adjustment lever 84 provided near the grip 81R for adjusting the pivoting drive mechanism 83 (FIG. 1).

Figure 4:
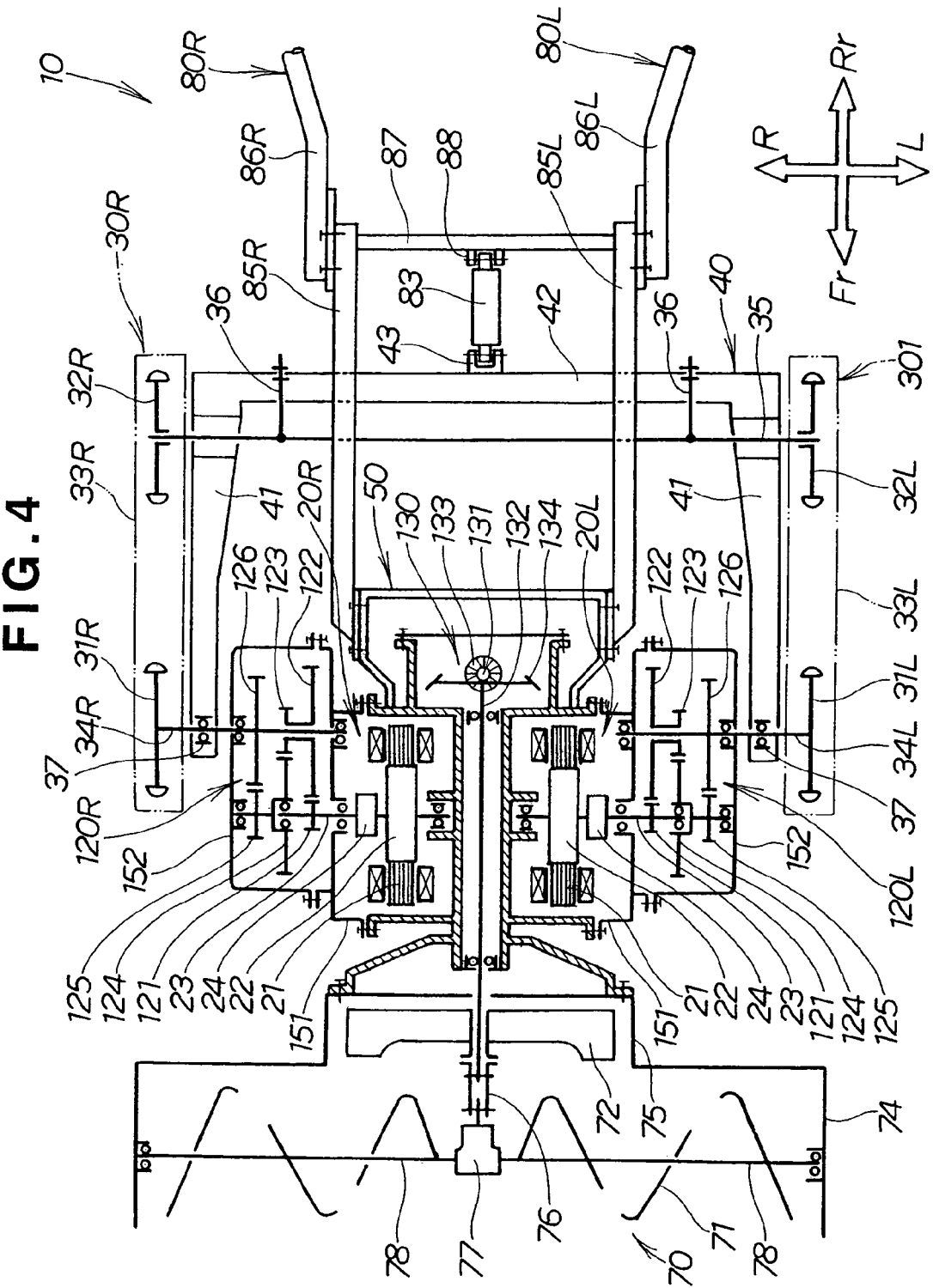
FIG. 4 is a schematic top plan view of the snow removing machine, which particularly shows the engine, electric motors, traveling sections, snow removing working section and other components around them.

FIG. 4 is a schematic top plan view of the snow removing machine 10, which particularly shows the engine 60, motors 20L and 20R, left and right traveling sections 30L and 30R, snow removing working section 70 and other component parts around them. As clearly seen in FIG. 4, the transmission case 50 is disposed between the left and right traveling sections 30L and 30R.

The traveling-component supporting frame 40 is generally in a U shape, which includes a pair of left and right side members 41 extending in the front-and-rear direction of the machine 10, a cross member 42 extending between rear portions of the left and right side members 41, and a bracket 43 secured to a middle portion of the cross member 42.

The left and right side members 41 each provide a frame that has a front portion rotatably supporting thereon a corresponding one of left and right driving-wheel axles 34L and 34R and a rear portion supporting thereon an idle-wheel axle 35 in conjunction with a rear portion of the other side member 41. The left and right driving-wheel axles 34L and 34R are each a rotation shaft having the left or right driving wheel 31L or 31R fixed thereto. The idle-wheel axle 35 a rotation shaft having the left or right idle wheel 32L or 32R mounted thereon for free rotation relative to the rotation shaft.

On the cross member 42, there are mounted left and right adjusting bolts 36 extending rearward from the idle-wheel axis 35. By operating the adjusting bolts 36, the idle-wheel axis 35 can be moved in the front-and-rear direction so as to adjust tension of the left and right crawler belts 33L and 33R.

The left motor 20L includes a ring-shaped outer stator 21, an inner rotor 22 surrounded by the outer stator 21, and a motor shaft 23 integrally combined with the inner rotor 22. The motor shaft 23 is braked via an electromagnetic brake 24 while the snow removing machine 10 is parked or at rest.

The left traveling power transmission mechanism 120L is a three-step speed reduction mechanism, which includes: a first small gear 121 mounted on the motor shaft 23; a first large gear 122 that is mounted on the left driving-wheel axle 34L for rotation relative to the axle 34L and for meshing engagement with the first small gear 121; a second small gear 123 integrally formed with the first large gear 122; a second large gear 124 that is mounted on the motor shaft 23 for rotation relative to the shaft 23 and for meshing engagement with the second small gear 123; a third small gear 125 integrally formed with the second large gear 124; and a third large gear 126 that is mounted on the left driving-wheel axle 34L for meshing engagement with the third small gear 125.

The above-mentioned gears 121–126 are each a spur gear. The right motor 20R is constructed in the same manner as the left motor 20L, and the right traveling power transmission mechanism 120R is constructed in the same manner as the left traveling power transmission mechanism 120L. In FIG. 4, reference numeral 37 represents a bearing.

The working power transmission mechanism 130 accommodated in the transmission case 50 is in the form of a one-step speed reduction mechanism, which includes an input shaft 131 extending substantially vertically, an output shaft 132 substantially horizontally, a small driving bevel gear 133 provided on the input shaft 131, and a large driven bevel gear 134 provided on the output shaft 132 for meshing engagement with the small driving bevel gear 133.

The output shaft 132 extends forward from the transmission case 50 and connects via the transmission shaft 76 to the snow removing working section 70. More specifically, the transmission shaft 76 is coupled with the front end of the output shaft 132, and left and right auger shafts 78 are connected to the transmission shaft 76 via a worm-gear type speed reduction mechanism 77. Also, the blower 72 is connected to the transmission shaft 76.

The following paragraphs detail an example construction of the left and right operating handles 80L and 80R, as well as a mounting construction of the pivoting drive mechanism 83.

The operating handles 80L and 80R each include a left or right handle base portion 85L or 85R extending rearward from an upper portion of the left or right side of the transmission case 50, and a left or right handle bar 86L or 86R mounted on and extending rearward from the rear end of the corresponding (left or right) handle base portion 85L or 85R in such a manner that its mounted angle to the corresponding base portion 85L or 85R is adjustable as desired. Cross member 87 connects between respective rear end portions of the left and right handle base portions 85L and 85R, and a bracket 88 is secured to a middle portion of the cross member 87.

The pivoting drive mechanism 83 is mounted with its upper and lower ends vertically pivotably connected to the bracket 43 of the traveling-component supporting frame 40 and to the bracket 88 of the cross member 87 connecting between the left and right handle base portions 85L and 85R.

The left and right driving-wheel axles 34L and 34R supported on the traveling-component supporting frame 40 are also rotatably supported on the transmission case 50. Thus, the transmission case 50 is pivotable in the vertical direction about the driving-wheel axles 34L and 34R. Namely, the pivoting drive mechanism 83 allows the transmission case 50 to pivot in the vertical direction (i.e., in a direction substantially perpendicular to the surface of the sheet of FIG. 4) in response to vertical movement, by the human operator, of the handle base portions 85L and 85R.

As described above, the engine 60 (FIG. 3) and snow removing working section 70 are mounted on the transmission case 50. Thus, the height of the snow removing working section 70 can be adjusted by vertical pivotal movement of the transmission case 50 together with the engine 60 and snow removing working section 70.

Figure 5:
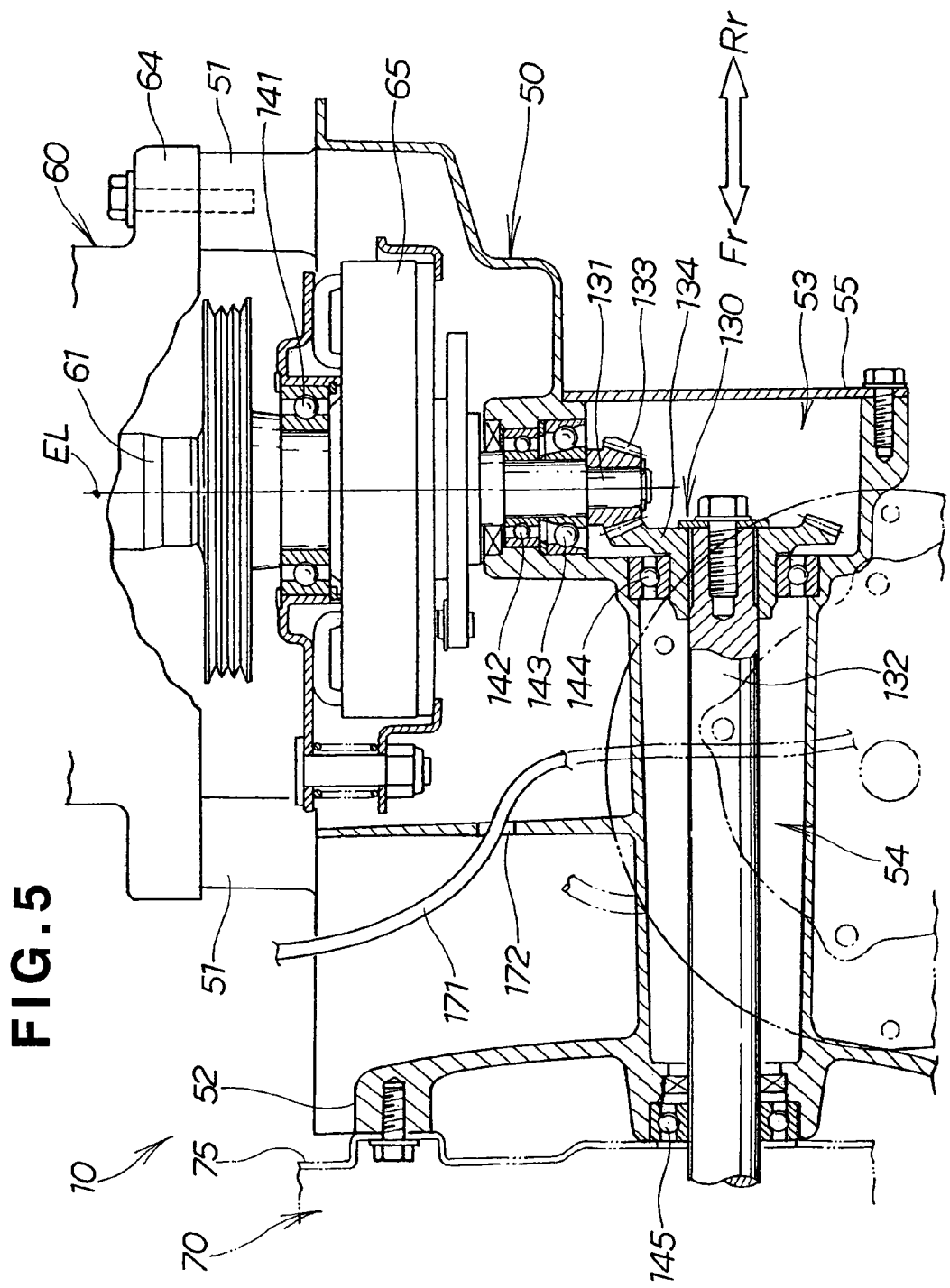
FIG. 5 is a vertical sectional view of a transmission case and working power transmission mechanism in the snow removing machine.

FIG. 5 is a vertical sectional view of the transmission case 50 and working power transmission mechanism 130, which particularly shows a left side of the working power transmission mechanism 130 accommodated in the transmission case 50.

As shown, the transmission case 50 has a plurality of mounting bosses 51 on an upper end surface thereof, and the engine 60 is mounted on the upper end of the transmission case 50 with its lower end portion 64 bolted to the mounting bosses 51. The transmission case 50 also has a mounting flange 52 on the front end thereof, and the snow removing working section 70 is mounted on the side of the transmission case 50 with the blower housing 75 bolted to the mounting flange 52.

The input shaft 131 of the working power transmission mechanism 130, which is located coaxially with the crankshaft 61, extends upward to connect to the lower end of the crankshaft 61 via a clutch 65.

The transmission case 50 also has a cylindrical input-shaft receiving section 53 and output-shaft receiving section 54 integrally formed with the remainder of the case 50, through which the input shaft 131 and output shaft 132 of the working power transmission mechanism 130 extend. Reference numeral 55 represents a rivet, and 141–145 bearings.

Figure 6:
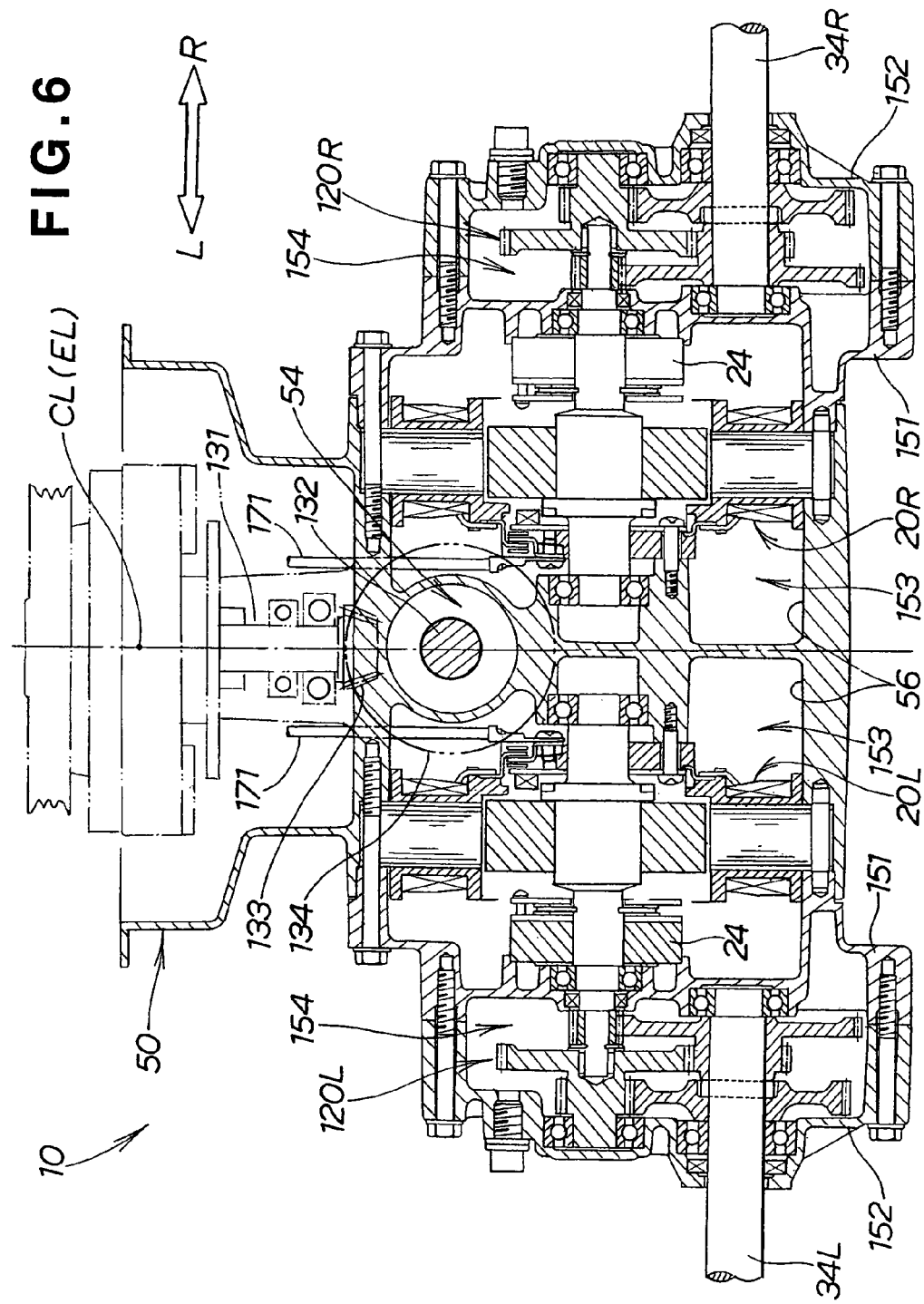
FIG. 6 is a vertical sectional view of the transmission case, electric motors and left and right traveling power transmission mechanisms in the snow removing machine.
Figure 7:
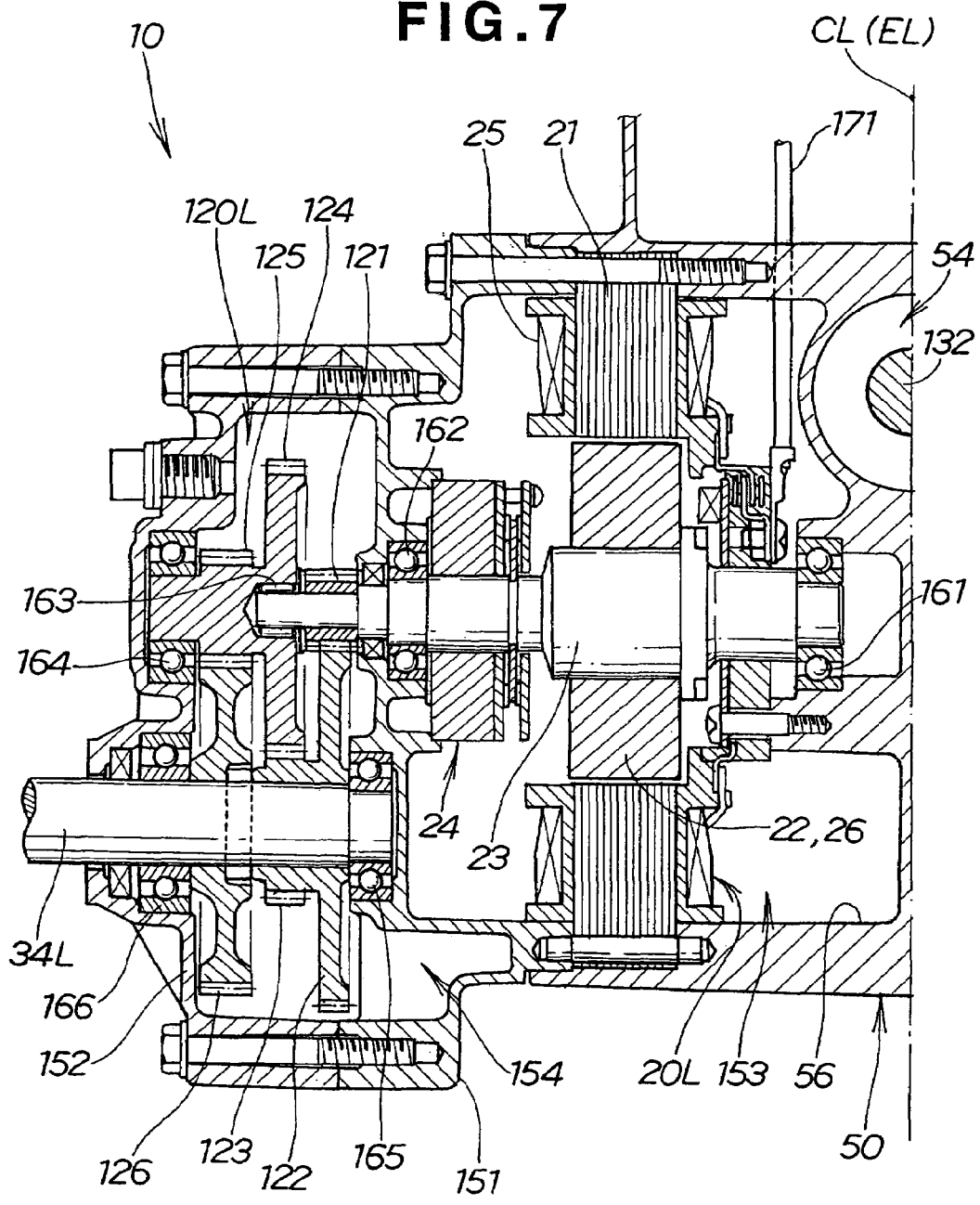
FIG. 7 is a vertical sectional view showing the transmission case, left electric motor and left traveling power transmission mechanism in the snow removing machine.

FIG. 6 is a vertical sectional view of the transmission case 50, electric motors 20L and 20R and left and right traveling power transmission mechanisms 120L and 120R, which particularly shows rear ends of the motors 20L and 20R accommodated in the transmission case 50 and traveling power transmission mechanisms 120L and 120R. FIG. 7 is a vertical sectional view showing the transmission case 50, left electric motor 20L and left traveling power transmission mechanism 120L in corresponding relation to FIG. 6. For ease of understanding, the traveling power transmission mechanisms 120L and 120R are shown in an unfolded view.

FIGS. 6 and 7 show that the left and right electric motors 20L and 20R, left and right traveling power transmission mechanisms 120L and 120R and driving-wheel axles 34L and 34R for left and right traveling sections 30L and 30R (FIG. 4) are provided on the left and right sides of the transmission case 50, and that the transmission case 50 functions as part of motor cases 153.

Specifically, the transmission case 50 includes the output-shaft receiving section 54 on the centerline CL, and motor reception sections 56 are formed integrally with left and right side portions of the output-shaft receiving section 54. The motor reception sections 56 have left and right open sides that are closed with motor case halves 151 bolted to the reception section 56, and left and right transmission covers 152 are bolted to the motor case halves 151 to cover the respective motor case halves 151.

In the above-described manner, the left and right motor reception sections 56 and motor case halves 151 together constitute the left and right motor cases 153. Thus, the motor reception sections 56 of the transmission case 50 function as part of the motor cases 153.

Further, the left and right motor case halves 151 and left and right transmission covers 152 together constitute left and right traveling power transmission mechanism cases 154. Thus, the left and right motor case halves 151 function as part of the traveling power transmission mechanism cases 154.

In the left and right motor cases 153, there are accommodated the left and right motors 20L and 20R and left and right electromagnetic brakes 24, respectively. As illustrated in FIG. 7, the left electric motor 20L is an inner-rotor type D.C. brushless motor which comprises a combination of the motor shaft 23 extending horizontally in the widthwise (left-and-right) direction of the machine 10, the outer stator 21 having a plurality of armatures 25 spaced apart from each other along the circumference of the stator 21 and the inner rotor 22 having a plurality of permanent magnets 26 spaced apart from each other along the circumference of the rotor 22. The right electric motor 20R is constructed similarly to the left electric motor 20L.

The left and right traveling power transmission mechanisms 120L and 120R are accommodated in the left and right traveling power transmission mechanism cases 154, respectively. The first small gear 121 and second large gear 124 are provided at a distal end portion of the motor shaft 23 extending into the corresponding traveling power transmission mechanism case 154. The second large gear 124 and third small gear 125 integrally formed with the second large gear 124 are also rotatably supported on the corresponding transmission covers 152. Reference numerals 161–165 represent bearings.

Harnesses (electric wires) for the motors 20L and 20R can be inserted in the transmission case 50 functioning also as the motor cases 153. Specifically, the harnesses 171 connected to the motors 20L and 20R within the respective motor receiving sections 56 are lead outside the case 50 through a harness hole 172 formed in the case 50 as illustrated in FIG. 5. Because the harnesses 171 are not exposed outside the machine, they can have increased durability and reliability.

Figure 8:
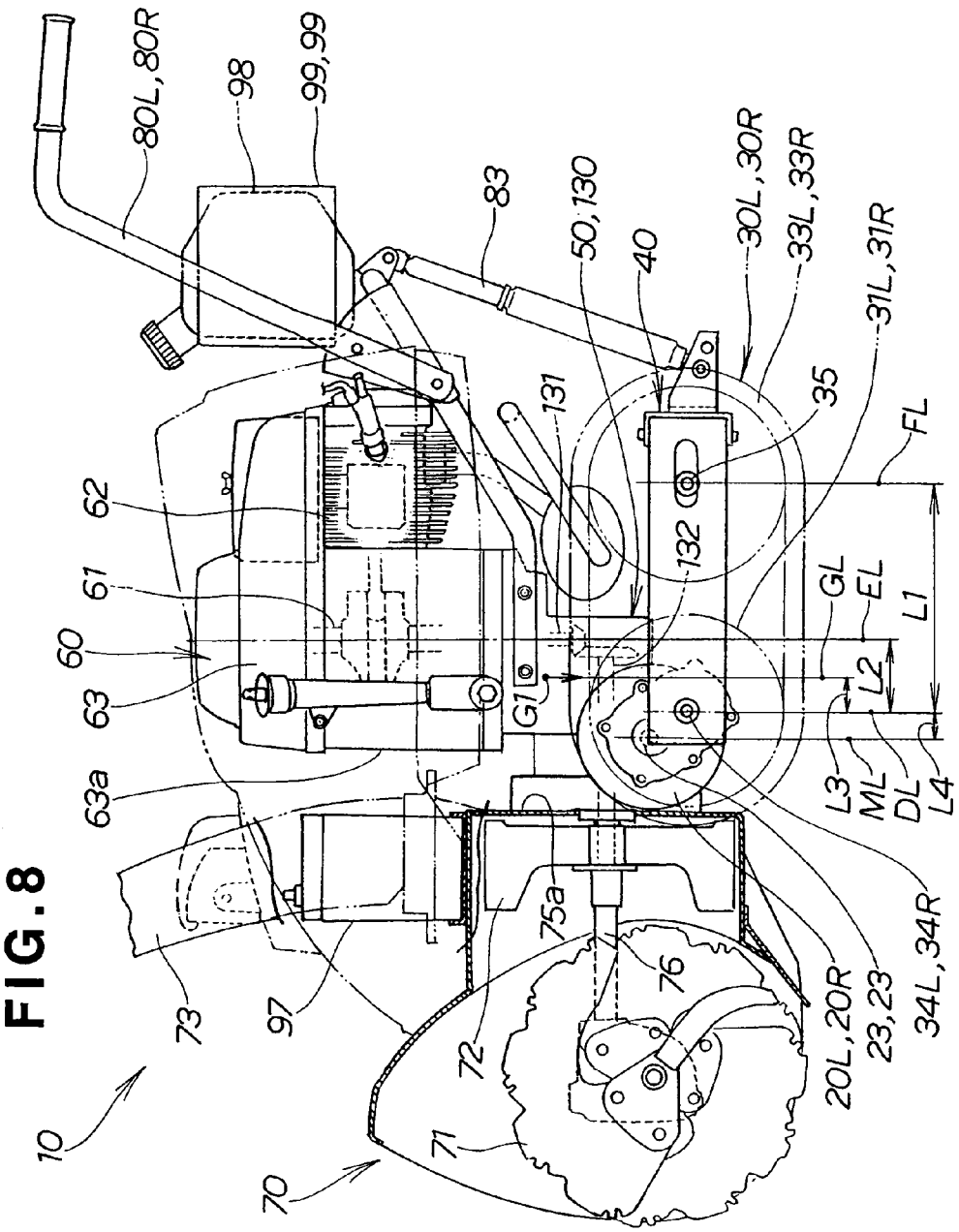
FIG. 8 is a side view of the snow removing machine of the invention, which particularly shows arrangement of various components in the snow removing machine.

FIG. 8 is a side view of the snow removing machine 10 of the present invention, which is particularly explanatory of arrangement of the various components of the machine 10.

When the snow removing machine 10 is viewed sideways, the crankshaft 61 has a central axis (centerline) EL, the driving-wheel axles 34L and 34R each have a central axis DL, the idle-wheel axle 35 has a central axis FL, the motor shafts 23 each have a central axis ML, and the machine 10 has an overall center of gravity G1 on a centerline GL.

In the snow removing machine 10, the transmission case 50, engine 60 and snow removing working section 70 are vertically pivotable as noted above about the central axis DL of the axles of the left and right driving wheels 31L and 31R, and the crankshaft 61 is positioned near and rearward of the central axis DL of the driving-wheel axles. Thus, the overall center of gravity G1 of the snow removing machine 10 is established between the crankshaft central axis EL and the axle central axis DL, and the motor shaft central axis ML is positioned near and forward (more specifically, forwardly upward) of the axle central axis DL.

The following explains specific examples of various distances in the front-and-rear direction of the snow removing machine 10. Distance between the axle central axes DL and FL is represented by L1, a distance from the axle central axis DL to the crankshaft central axis EL is represented by L2, a distance from the axle central axis DL to the centerline GL passing the center of gravity G1 is represented by L3, and, a distance from the axle central axis DL to the motor shaft central axis ML is represented by L4.

The distance L2 is about one third of the distance L1 and is sufficiently smaller than the latter. The distance L3 is about half the distance L2 and is sufficiently smaller than the latter. The distance L4 is about half the distance L2 and is sufficiently smaller than the latter.

As set forth above, the working power transmission mechanism 130 is positioned immediately beneath the vertical engine 60. Further, the snow removing working section 70 is positioned in front of the transmission mechanism 130, the left and right crawler belts 33L and 33R are positioned adjacent to and along the left and right sides of the transmission mechanism 130, and the left and right driving wheels 31L and 31R and the left and right motors 20L and 20R are positioned adjacent to the front ends of the respective crawler belts 33L and 33R. Further, the transmission case 50, engine 60, working power transmission mechanism 130 and snow removing working section 70 are vertically pivotable as noted above about the central axis DL of the axles of the left and right driving wheels 31L and 31R. Furthermore, the crankshaft 61 is positioned near and rearward of the axle central axis DL, so that the heavy engine 60 can be positioned near and rearward of the axle central axis DL.

By thus setting the overall center of gravity G1 of the snow removing machine 10 between the crankshaft central axis EL and the axle central axis DL, optimal weight balance can be established in the front-and-rear direction of the snow removing machine 10. Thus, the lower end of the snow removing working section 70 is allowed to readily bite or cut into a snow surface so as to achieve an enhanced snow removing capability and finish quality. Besides, it is possible to attain a superior traveling performance of the crawler belts 33L and 33R on the snow surface.

Further, because the heavy engine 60, transmission mechanism 130 and motors 20L and 20R are disposed near the axle central axis DL of the driving wheels 31L and 31R, the snow removing working section 70 can be caused to vertically pivot about the axle central axis DL with a relatively small operating force by the human operator. This arrangement can facilitate operation for vertically pivoting the working section 70 so as to set a desired biting angle of the working section 70 relative to the snow surface.

Figure 9A:
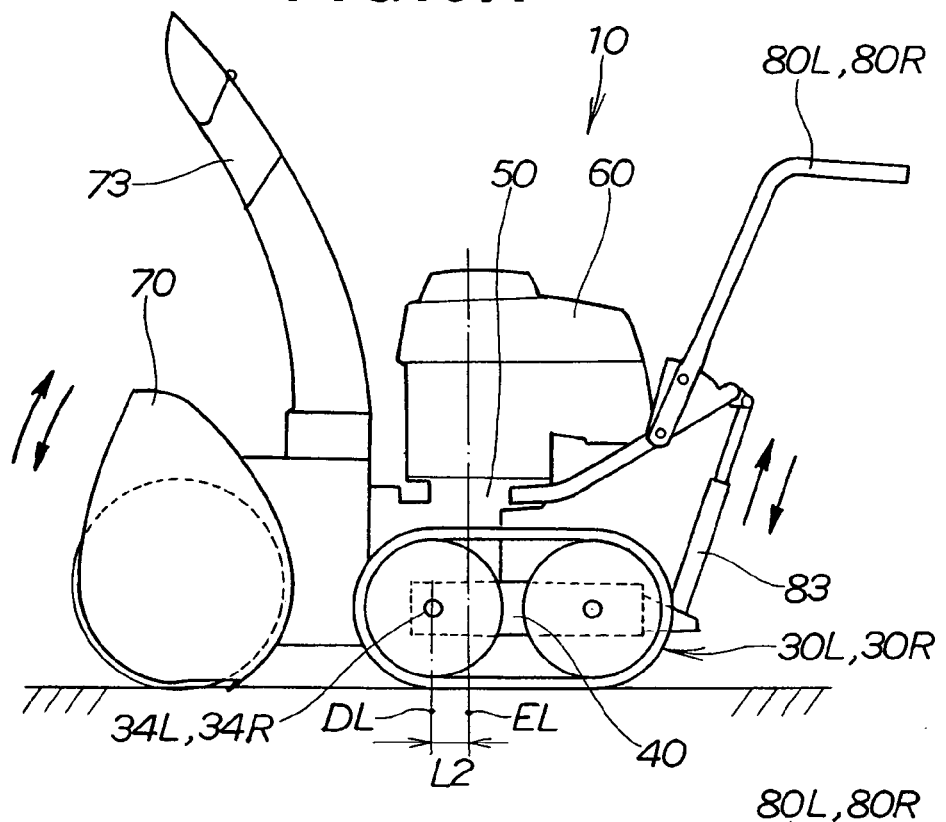
FIGS. 9A and 9B are views explanatory of behavior of the snow removing machine of the present invention
Figure 9B:
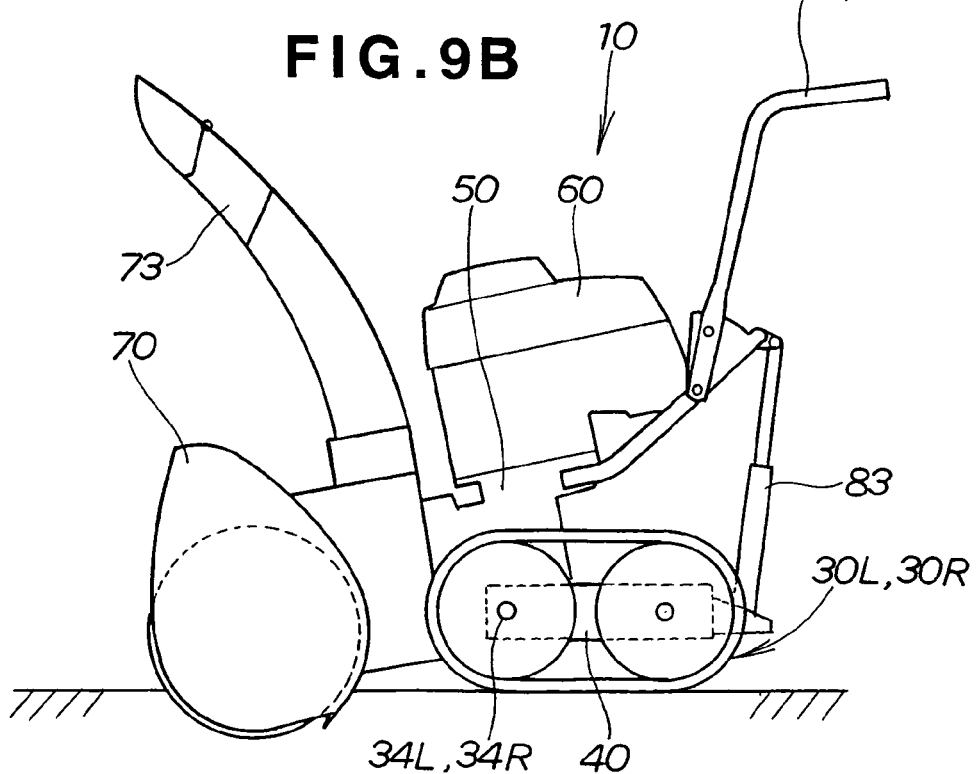

FIGS. 9A and 9B are views explanatory of operation of the snow removing machine 10 of the present invention.

FIG. 9A shows the snow removing working machine 10 with the working section 70 placed in a substantially horizontal position. By activating the pivoting drive mechanism 83 under this condition, the transmission case 50 is caused to pivot vertically about the axle central axis DL of the driving wheels 34L and 34R. By such vertical pivotal movement of the transmission case 50, the height of the snow removing working section 70 can be adjusted as desired.

The following paragraphs further set fourth behavior of the snow removing working machine 10 with primary reference to FIG. 8.

As set forth above, the transmission case 50 is positioned between the left and right traveling sections 30L and 30R, the engine 60 is mounted on the upper surface of the transmission case 50, the snow removing working section 70 is attached to the front of the transmission case, and the left and right motors 20L and 20R and driving-wheel axles 34L and 34R for the traveling sections 30L and 30R are mounted on the sides of the transmission case 50. With such arrangements, the transmission case 50, accommodating the transmission mechanism 130 for transmitting power from the engine 60 to the working section 70, can function also as the main frame (body) of the snow removing machine 10.

Therefore, the present invention can dispense with a separate main frame for mounting the engine 60, snow removing working section 70, motors 20L and 20R and driving-wheel axles 34L and 34R. As a result, it is possible to significantly reduce the size and weight of the snow removing machine 10, as well as the number of component parts of the machine 10. With the reduced size, the operability of the snow removing machine 10 can be enhanced.

Because the driving-wheel axles 34L and 34R are also mounted on the transmission case 50 functioning also as the main frame, the weights of the engine 60, snow removing working section 70, motors 20L and 20R and driving-wheel axles 34L and 34R can suitably act, via the axles 34L and 34R, on the traveling sections 30L and 30R. As a consequence, a sufficient driving force can be attained for the traveling sections 30L and 30R, so that the traveling performance of the sections 30L and 30R can be enhanced.

In the vertical engine 60, the cylinder section 62, in which the not-shown piston (not shown) reciprocates back and forth, extends rearwardly, and the engine body 63 has a front surface 63a adjacent to the rear surface 75a of the snow removing working section 70. Thus, the vertical engine 60 can be positioned close to the snow removing working section 70.

Further, the transmission mechanism 130 includes the upward input shaft 131 and forward output shaft 132, and the vertical engine 60 is mounted on the transmission case 50. Further, the crankshaft 61 extending downward from the vertical engine 60 is coupled to the upward input shaft 131, and the snow removing working section 70 is attached to the front of the transmission case 50 and coupled via the transmission shaft 75 to the forward output shaft 132. With the vertical engine 60 positioned close to the snow removing working section 70, the front-to-rear dimension of the transmission case 50 can be reduced.

As a result, the overall size of the snow removing machine 10 can be significantly reduced, and the reduced length of the machine 10 can enhance a turning capability of the machine 10.

Furthermore, the reduced front-to-rear dimension of the transmission case 50 can reduce the length of the output shaft 132. As a consequence, it is possible to reduce a bending moment produced in the output shaft 132, so that the output shaft 132 may have a smaller diameter and the bearings supporting the output shaft 132 may have a smaller size.

In addition, the heavy vertical engine 60, transmission mechanism 130 and transmission case 50 can be positioned closer to the snow removing working section 70. By thus setting the center of gravity of the snow removing machine 10 at a position closer to the front end of the machine, the lower end of the snow removing working section 70 is allowed to readily bite into a snow surface so as to achieve an enhanced snow removing capability and finish quality.

Figure 12:
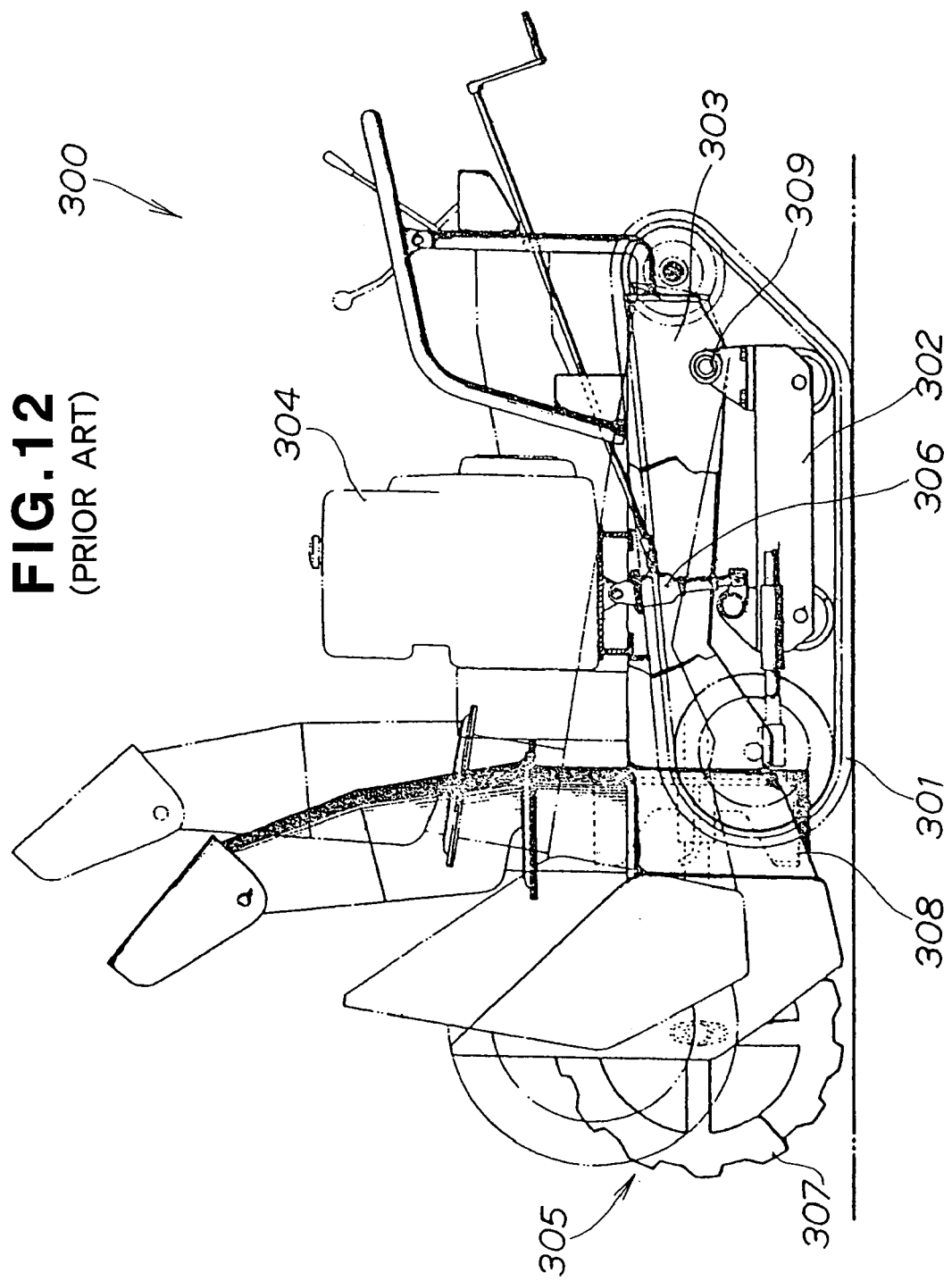
FIG. 12 is a side view of a conventional working machine.
Figure 13:
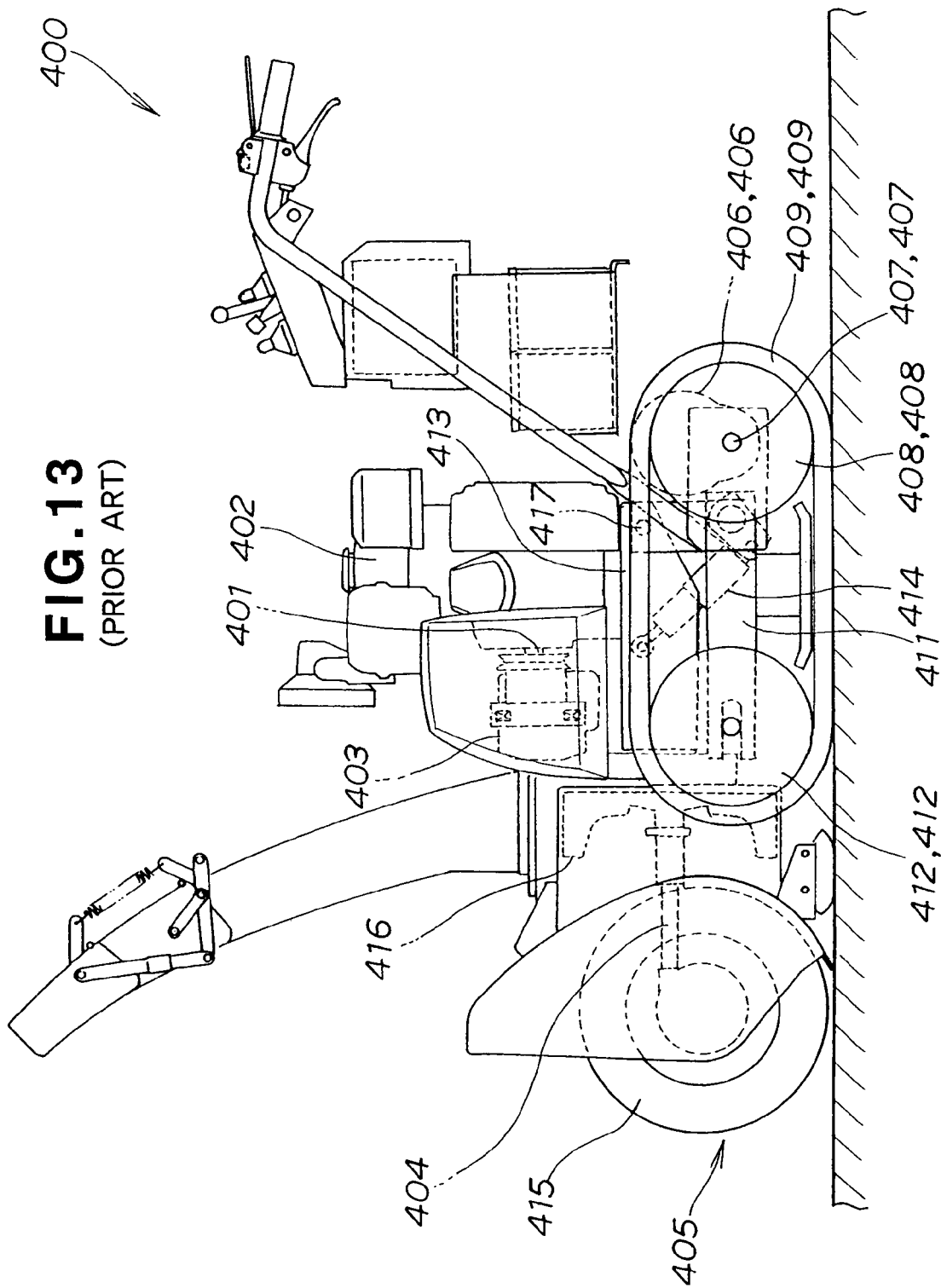
FIG. 13 is a side view of another conventional working machine.
Figure 14:
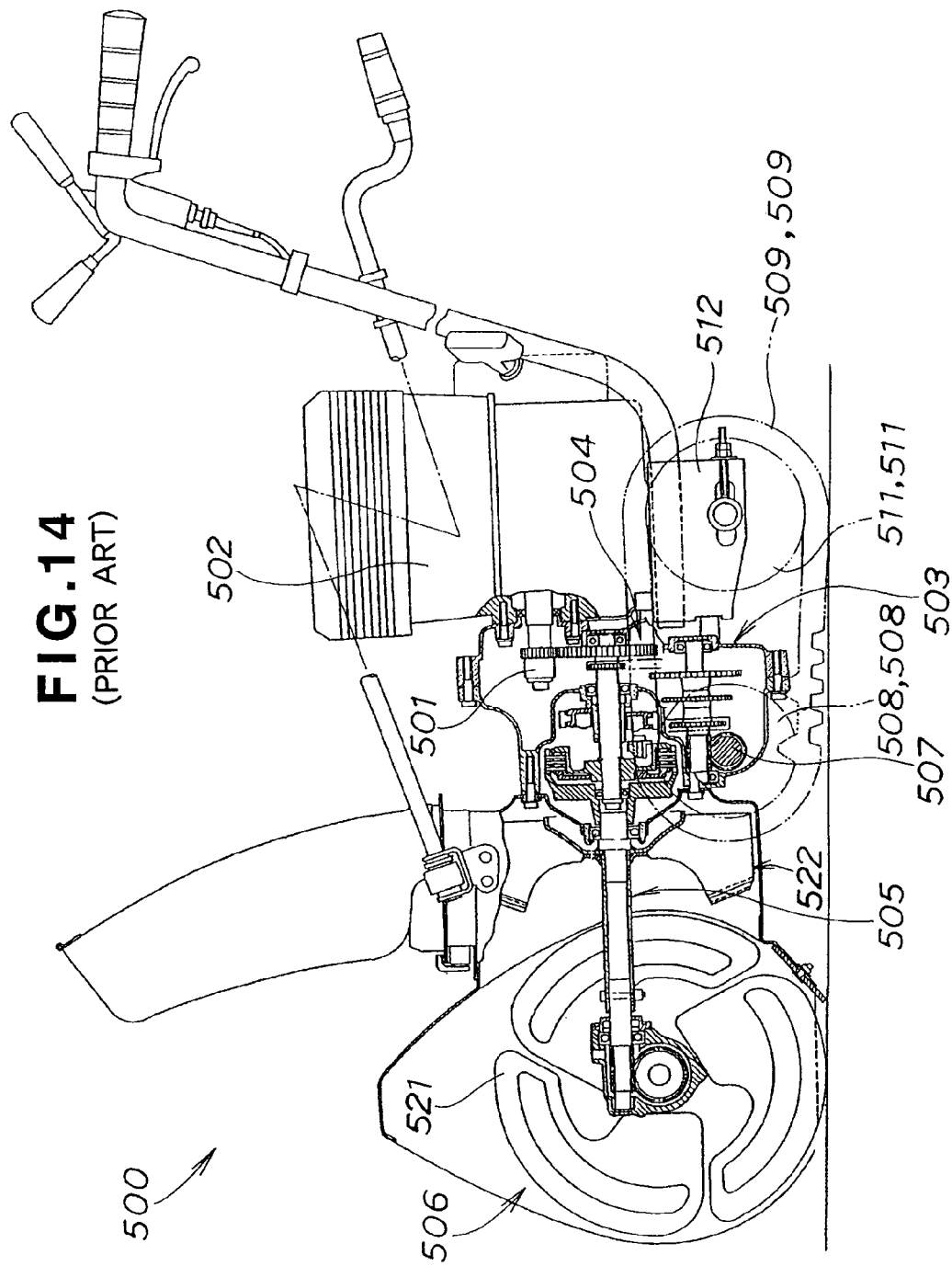
FIG. 14 is a side view of still another conventional working machine.

Next, a description will be made another embodiment of the working machine of the present invention, with reference to FIGS. 10 and 12. This embodiment is constructed as a cultivating machine.

FIG. 10 is a left side view of the cultivating machine 200 of the present invention. This cultivating machine 200 is constructed to transmit power from an engine 210 to a working section 240 via a working power transmission mechanism 230 accommodated in a transmission case 220, and also transmit power from left and right electric motors 250L and 250R to left and right traveling sections 270L and 270R via traveling power transmission mechanism 260L and 260R.

Specifically, in the cultivating machine 200 which is constructed as a self-propelled walking-type cultivator, the engine 210 is mounted on an upper surface portion of the transmission case 220 functioning also as a machine body or main frame of the machine 200, and the left and right motors 250L and 250R, traveling power transmission mechanism 260L and 260R and axles 271L and 271R of the left and right traveling sections 270L and 270R are attached to front left and right sides of the transmission case 220. The cultivating working section 240 is attached to a rear side portion of the transmission case 220. Further, left and right operating handles 281L and 281R extend rearwardly and upwardly from a rear portion of the transmission case 220. Human operator can manipulate the operating handles 281L and 281R while walking behind the cultivating working section 240.

The cultivating working section 240 has a plurality of cultivating claws 241. Each of the traveling sections 270L, 270R includes a traveling wheel 272L, 272R mounted on an axle 271L, 271R. Reference numerals 282L and 282R represent grips, 291 an engine cover, 292 a machine body guard (protector), 293 a fender (dirt scattering preventing cover), and 294 a resisting bar.

Figure 11:
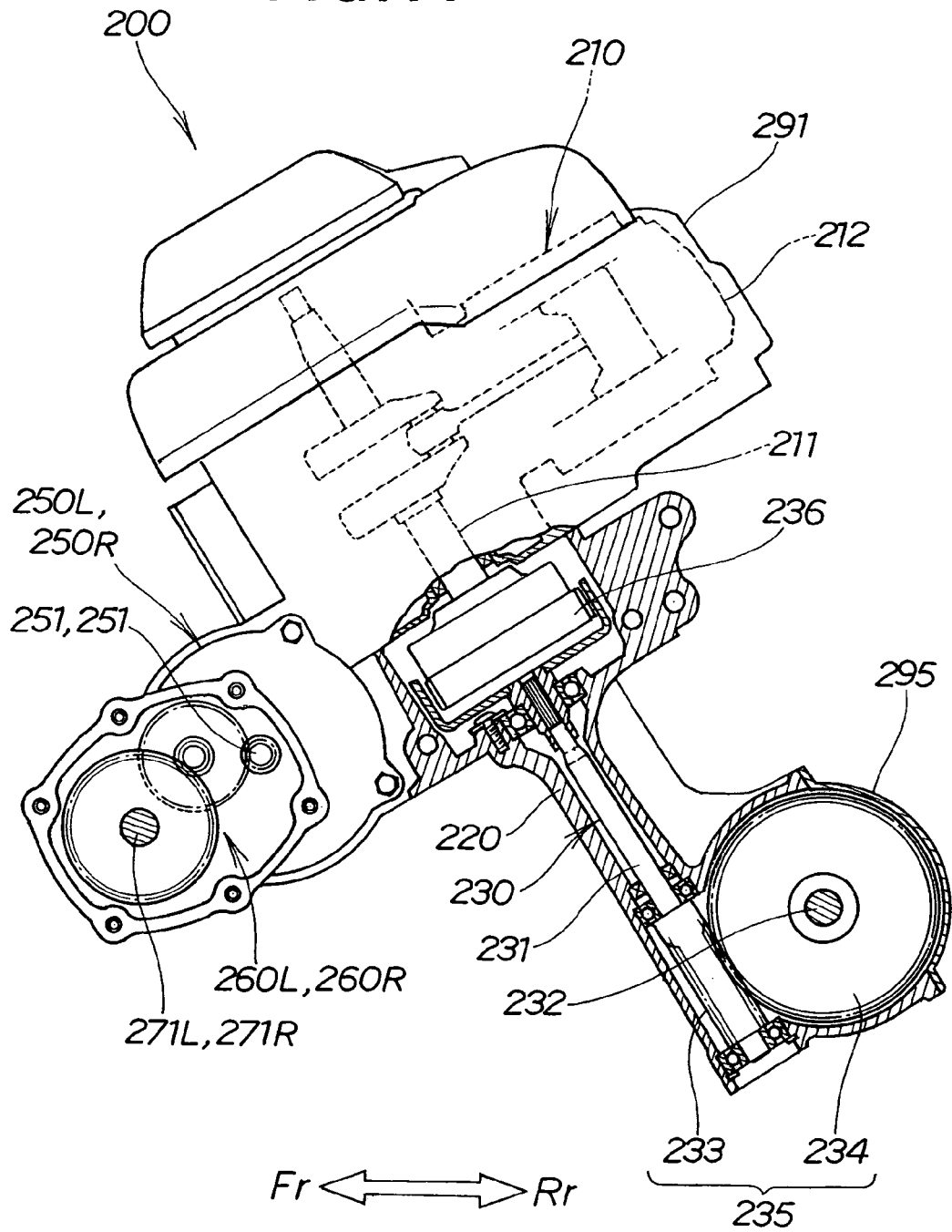
FIG. 11 is a side view of the cultivating machine, which particularly shows an engine, electric motors, traveling sections, cultivating working section and other components around them.

FIG. 11 is a side view of the cultivating machine 200, which particularly shows the engine, electric motors, traveling sections, cultivating working section and other components around them.

The engine 210, which is a working drive source in the form of a vertical engine having a downwardly-extending crankshaft 211, drives the cultivating working section 240.

The working power transmission mechanism 230 includes an input shaft extending upward to connect to the vertical engine 210, an output shaft 232 extending horizontally in a widthwise direction of the machine 200 (i.e., in a direction perpendicular to the sheet of the figure) to connect to the working section 240 (see FIG. 10), and a speed reduction mechanism 235 having a worm 232 provided on the input shaft 231 and a worm wheel 234 provided on the output shaft 232. The input shaft 231 is located coaxially with the crankshaft 211 and extends upward to connect to the lower end of the crankshaft 211 via a clutch 236.

The left and right motors 250L and 250R are traveling drive sources for driving the left and right traveling sections 270L and 270R via the respective traveling power transmission mechanisms 260L and 260R.

In the figure, reference numeral 212 represents a cylinder section, 251 represents a motor shaft of the motor 250L, 250R, and 295 a lid.

Because the engine 210 is mounted on the upper surface portion of the transmission case 220 and the left and right motors 250L and 250R and axles 271L and 271R of the left and right traveling sections 270L and 270R are attached to the left and right sides of the transmission case 220, the transmission case 220, accommodating the working power transmission mechanism 230 for transmitting power from the engine 210 to the working section 240, can function also as the main frame (body) of the cultivating machine 200. Therefore, the present invention can dispense with a separate main frame for mounting the engine 210, working section 240, motors 250L and 250R and driving-wheel axles 271L and 271R. As a result, it is possible to significantly reduce the size and weight of the cultivating machine 200, as well as the number of component parts of the machine 200. With the reduced size, the operability of the cultivating machine 200 can be enhanced.

It should be appreciated that the working machine of the present invention may be embodied as any other suitable machine or equipment than the snow removing machine and cultivating machine.

In summary, the present invention arranged in the above-described manner can dispense with a separate main frame for mounting the working drive source, working unit, electric motors and driving axles. As a result, it is possible to significantly reduce the size and weight of the working machine, as well as the number of necessary component parts of the machine. With the reduced size, the operability of the working machine can be enhanced to a significant degree. The present invention can also establish optimal weight balance in the front-and-rear direction of the working machine. Thus, in the case where the working machine of the present invention is constructed as a snow removing machine, the lower end of the snow removing working section is allowed to readily bite into a snow surface so as to achieve an enhanced snow removing capability and finish quality; besides, it is possible to secure a superior travel performance of the crawler belts on the snow surface.

Obviously, various minor changes and modifications of the present invention are possible in the light of the above teaching. It is therefore to be understood that within the scope of the appended claims the invention may be practiced otherwise than as specifically described.

What is claimed is:

1. A working machine comprising:
    a transmission case having a transmission mechanism accommodated therein, the transmission mechanism having an input shaft having a first longitudinal axis and an output shaft having a second longitudinal axis extending in a direction substantially perpendicular to the first longitudinal axis;
    a working unit mounted to a front portion or a side portion of the transmission case and connected to the output shaft of the transmission mechanism;
    a working drive source connected to the input shaft of the transmission mechanism for driving the working unit via the transmission mechanism, the working drive source being mounted to an upper surface portion of the transmission case;
    a traveling unit having at least one driving axle mounted to a side portion of the transmission case; and
    an electric motor mounted to a side portion of the transmission case for driving the traveling unit.

2. A working machine as claimed in claim 1; wherein the working drive source comprises an engine, the working unit comprises a snow removing working section mounted to the front portion of the transmission case, and the traveling unit comprises a pair of traveling sections each having a driving axle rotationally mounted to a side portion of the transmission case and a crawler belt connected to the driving axles for rotation therewith; and wherein the transmission case is disposed between the pair of traveling sections.

3. A working machine as claimed in claim 1; wherein the transmission case comprises a part of a case of the electric motor.

4. A working machine as claimed in claim 2; wherein the transmission case comprises a part of a case of the electric motor.

5. A working machine comprising:
    a transmission case having a transmission mechanism accommodated therein;
    a working unit mounted to a front portion or a side portion of the transmission case and connected to the output shaft of the transmission mechanism;
    a working drive soilrce connected to the input shaft of the transmission mechanism for driving the working unit via the transmission mechanism, the working drive source being mounted to an upper surface portion of the transmission case;
    a traveling unit having a driving axle mounted to a side portion of the transmission case; and
    an electric motor mounted to a side portion of the transmission case for driving the traveling unit;
    wherein the working drive source comprises a vertical engine having a downwardly-extending crankshaft, the working unit comprises a snow removing working section, the traveling unit comprises left and right crawler belts drivable by the electric motor via left and right driving wheels, and the snow removing working section is vertically pivotable about a central axis of axles of the left and right driving wheels together with the vertical engine and transmission mechanism;
    wherein the transmission mechanism is disposed immediately below the vertical engine, the snow removing working section is disposed in front of the transmission mechanism, the left and right crawlers belts are disposed adjacent to and along left and right sides of the transmission mechanism, the left and right driving wheels and the electric motor are disposed adjacent to front end portions of the crawler belts, and the crankshaft is disposed near and rearwardly of the central axis of the axles; and
    wherein an overall center of gravity of the working machine is set between a central axis of the crankshaft and the central axis of the axles.

6. A working machine as claimed in claim 5; wherein the vertical engine has a cylinder section oriented toward a rear end of the working machine, and a body having a front surface disposed adjacent to a rear surface of the snow removing working section.

7. A working machine as claimed in claim 1; wherein the at least one driving axle of the traveling unit comprises a pair of driving axles mounted to side portions of the transmission case for undergoing rotation, the traveling unit further comprising a pair of driving wheels mounted on the respective driving axles for rotation therewith; and wherein the working unit, the working drive source and the transmission mechanism are vertically pivotable about a central axis of the driving axles of the traveling unit.

8. A working machine as claimed in claim 7; wherein the working drive source comprises a vertical engine having a downwardly-extending crankshaft connected to the input shaft of the transmission mechanism.

9. A working machine as claimed in claim 8; wherein an overall center of gravity of the working machine is set between a central axis of the crankshaft and the central axis of the driving axles.

10. A working machine as claimed in claim 1; wherein the at least one driving axle of the traveling unit comprises a pair of driving axles mounted to side portions of the transmission case for undergoing rotation, the traveling unit further comprising a pair of driving wheels mounted on the respective driving axles for rotation therewith and a pair of crawler belts driven by the driving wheels, the crawler belts having first end portions and second end portions disposed closer to the working unit than the first end portions; and wherein the driving wheels of the traveling unit and the working drive source are disposed adjacent to the second end portions of the crawler belts.

11. A working machine as claimed in claim 1; wherein the at least one driving axle of the traveling unit comprises a pair of driving axles mounted to side portions of the transmission case for undergoing rotation, the traveling unit further comprising a pair of driving wheels mounted on the respective driving axles for rotation therewith, an idlewheel axle mounted to the transmission case, and a pair of idle wheels mounted on the idle-wheel axle for relative rotation thereto; and wherein the working drive source has a crankshaft connected to the input shaft of the transmission mechanism and the electric motor has a motor shaft.

12. A working machine as claimed in claim 11; wherein a distance $L2$ between a central axis of the driving axles and a central axis of the crankshaft is about $\frac{1}{3}$ of a distance $L1$ between the central axis of the driving axles and a central axis of the idlewheel axle; wherein a distance $L3$ between the central axis of the driving axles and a line passing through a center of gravity of the working machine is about ½ the distance L2; and wherein a distance L4 between the central axis of the driving axles to a central axis of the motor shaft is about ½ the distance L2.

13. A working machine comprising: a transmission case; a transmission mechanism disposed in the transmission case and having an input shaft and an output shaft; a working drive source mounted on the transmission case and connected to the input shaft of the transmission mechanism; a working unit driven by the working drive source during a working state of the working unit for performing a working operation, the working unit being mounted on the transmission case and connected to the output shaft of the transmission mechanism; at least one electric motor mounted on the transmission case; and a traveling unit driven by the electric motor for transporting the working machine during the working operation, the traveling unit being mounted on the transmission case and having at least one driving axle; wherein the working unit, the working drive source and the transmission mechanism are pivotable about a central axis of the driving axle of the traveling unit.

14. A working machine as claimed in claim 13; wherein the input and output shafts of the transmission mechanism have respective longitudinal axes disposed substantially perpendicular to one another.

15. A working machine as claimed in claim 13; wherein the working drive source comprises a vertical engine having a crankshaft connected to the input shaft of the transmission mechanism.

16. A working machine as claimed in claim 15; wherein an overall center of gravity of the working machine is set between a central axis of the crankshaft and the central axis of the driving axle.

17. A working machine as claimed in claim 13; wherein the traveling unit further comprises a driving wheel mounted on the driving axle for rotation therewith and a crawler belt driven by the driving wheel, the crawler belt having a first end portion and a second end portion disposed closer to the working unit than the first end portion; and wherein the driving wheel and the working drive source are disposed adjacent to the second end portion of the crawler belt.

18. A working machine as claimed in claim 13; wherein the traveling unit further comprises a driving wheel mounted on the driving axle for rotation therewith, an idle-wheel axle mounted to the transmission case, and an idle wheel mounted on the idle-wheel axle for relative rotation thereto; and wherein the working drive source has a crankshaft connected to the input shaft of the transmission mechanism and the electric motor has a motor shaft.

19. A working machine as claimed in claim 18; wherein a distance L2 between a central axis of the driving axle and a central axis of the crankshaft is about ⅓ of a distance L1 between the central axis of the driving axle and a central axis of the idle-wheel axle; wherein a distance L3 between the central axis of the driving axle and a line passing through a center of gravity of the working machine is about ½ the distance L2; and wherein a distance L4 between the central axis of the driving axle to a central axis of the motor shaft is about ½ the distance L2.

20. A working machine as claimed in claim 19; wherein the center of gravity of the working machine is set between the central axis of the crankshaft and the central axis of the driving axle.

21. A working machine as claimed in claim 1; wherein the electric motor comprises a first electric motor, and further comprising a second electric motor for driving the traveling unit; wherein the transmission case comprises an output-shaft receiving section through which the output shaft extends and a plurality of motor reception sections integral with respective side portions of the output-shaft receiving section and accommodating therein the respective first and second electric motors.

22. A working machine as claimed in claim 21; wherein the motor reception sections are connected to motor case halves of the electric motors.

23. A working machine as claimed in claim 13; wherein the at least one electric motor comprises a pair of electric motors; and wherein the transmission case comprises an output-shaft receiving section through which the output shaft extends and a plurality of motor reception sections integral with respective side portions of the output-shaft receiving section and accommodating therein the respective electric motors.

24. A working machine as claimed in claim 23; wherein the motor reception sections are connected to motor case halves of the electric motors.

* * * * *